May 13, 1969   H. WATANABE ET AL   3,444,067
METHOD OF FILLING AN ELECTRODE TUBE WITH LIQUID
Filed July 12, 1965
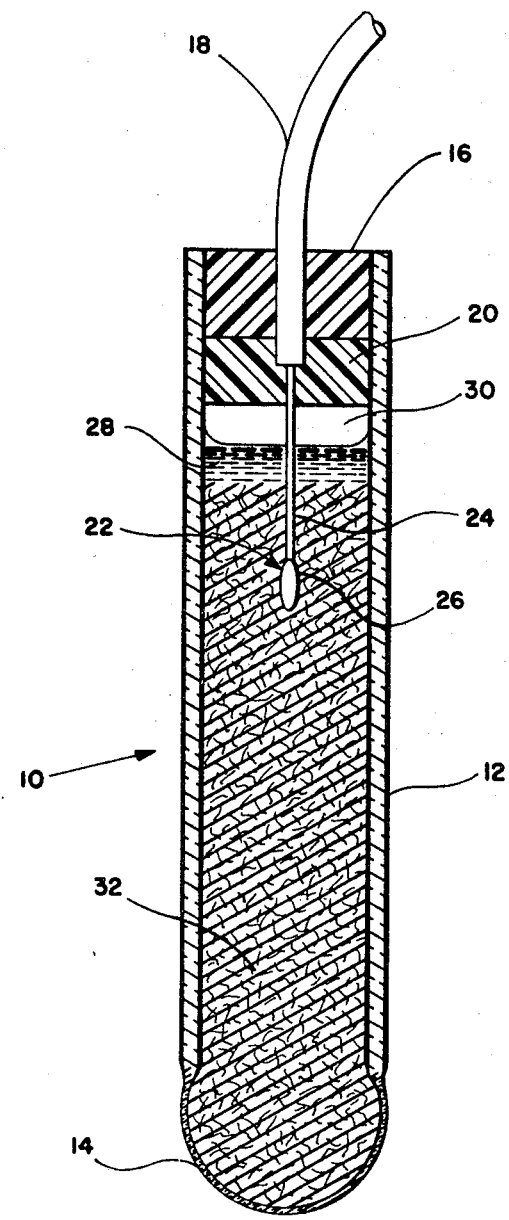
EDMUND E. BUZZA,
HIDEO WATANABE
*INVENTORS*
BY 3,444,067
METHOD OF FILLING AN ELECTRODE TUBE WITH LIQUID
Hideo Watanabe and Edmund E. Buzza, Fullerton, Calif., assignors to Beckman Instruments, Inc., a corporation of California
Filed July 12, 1965, Ser. No. 471,366
Int. Cl. B01k 3/04, 3/00
U.S. Cl. 204—195          2 Claims

ABSTRACT OF THE DISCLOSURE

The specification discloses an electrochemical electrode comprising a tube for containing electrolyte and having an ion sensitive bulb at one end partially or substantially filled with a porous body such as packed glass wool, quartz wool or asbestos fibers to prevent movement of gas bubbles to the bulb if the electrode is reoriented from its usual vertical position or if the electrode is within a zero gravitational environment. Methods of filling the electrode tube with a liquid are also disclosed. One of the methods comprises filling the tube with a solvent having a boiling point below that of the liquid, positioning the porous body in the tube, submerging the tube into a body of the liquid, and heating the liquid to the boiling point of the solvent whereby the liquid displaces the solvent which escapes as a vapor.

---

The invention described herein was made in the performance of work under a NASA contract and is subject to the provisions of Section 305 of the National Aeronautics and Space Act of 1958, Public Law 85–568 (72 Stat. 435; 42 U.S.C. 2457).

This invention relates to an electrochemical electrode for measuring the ion concentration of solutions and, more particularly, to such an electrode which is adaptable for use in any physical orientation and in zero gravity environments.

A typical electrochemical electrode for measuring the ion concentration of solutions includes a tubular member of nonconductive glass closed at one end by an ion sensitive barrier, such as a bulb of ion sensitive glass. An internal half cell is positioned in the tubular member for contact with liquid electrolyte therein. Normally the electrode is so disposed that the ion sensitive barrier is at the bottom of the electrode body whereby the electrolyte is held in contact with the barrier by gravitational force.

Sometimes the electrochemical electrode is filled with electrolyte under conditions such that no airspace is provided in the electrode. However, occasionally a bubble may form in the electrode due to leaks in the seal closing the electrode, resulting in air bubbles being formed therein. However, in most cases an airspace is purposely provided above the electrolyte in the electrode for the purpose of permitting the electrolyte to expand when the electrode is used in elevated temperature environments. If the electrode is positioned on its side or in an inverted position when used, or when the electrode is in a zero gravity environment, bubbles of air sometimes migrate to the ion sensitive barrier adversely influencing the pH measurements of the electrode. Generally an air bubble in contact with the ion sensitive barrier results in the millivolt output of the electrode decreasing. The smaller the size of the ion sensitive barrier, the greater is the effect of the bubble. The reason for this behavior is believed to be caused by the apparent resistance change in the ion sensitive barrier. When the bubble contacts the ion sensitive barrier, the contact area of the barrier with the liquid electrolyte in the electrode is decreased which increases the resistance of the barrier.

It is, therefore, the principal object of the present invention to provide an electrochemical electrode for measuring the ion concentration of solutions which may be used in any physical orientation and in zero gravity environments without gas bubbles migrating to the ion sensitive barrier of the electrode.

Another object of the invention is to provide a method for filling with a liquid a container, such as the above-mentioned electrode, having a porous body therein without the formation of gas bubbles within liquid in the container.

According to the principal aspect of the present invention, gas bubbles in the upper portion of an electrochemical electrode are prevented from migrating to the ion sensitive barrier thereof by filling at least a section of the electrode with an inert porous body having a relatively large surface area. Since there is a higher interfacial or surface tension between a solid and a liquid than between a solid and a gas, the porous body with a large surface area, which maximizes the surface tension of the body for a liquid, prevents the movement of gas bubbles through the body when the body is wetted by a liquid electrolyte. Since gas bubbles normally found above the liquid electrolyte in an electrochemical electrode cannot migrate through the porous body, the electrode of the invention may be used in any physical orientation and also under zero gravity environments without the migration of gas bubbles to the ion sensitive barrier and resultant errors in ion concentration measurements.

According to another aspect of the invention, there is provided a method of filling with a liquid a container, such as the above-mentioned electrode, where the container holds a porous body, but without the formation of bubbles in the liquid. This is accomplished by first filling the container with a solvent having a boiling point below that of the liquid with which the container is to be filled. Then, the porous body is positioned in the container and the container submerged into a body of the liquid. Thereafter, the body of liquid is heated to the boiling point of the solvent whereby the liquid displaces the solvent in the container which escapes to the atmosphere in the form of a vapor. By this method, the liquid is caused to completely fill the container and the interstices of the porous body therein without the formation of any gas bubbles in the liquid.

Other objects, aspects and advantages will become apparent from the following description taken in connection with the accompanying drawing wherein the electrode of the invention is illustrated in longitudinal section.

Referring now to the drawing in detail, the electrochemical electrode of the invention, referred to generally by numeral 10, comprises a tubular member 12 of nonconductive material such as glass having its lower open end closed by an ion sensitive barrier 14. The barrier may be in the form of an ion sensitive glass bulb, as illustrated in the drawing, or any other ion sensitive barrier.

The upper end of the tubular member 12 is closed by an epoxy material 16 which mounts an electric cable 18 by means of which the electrode is connected to a suitable circuit, such as to a pH meter. The cable 18 extends through the epoxy 16 and a sealing resin 20 into the interior of the tubular member 12 and terminates in an internal half cell 22. The internal half cell, as illustrated, comprises a silver wire 24 coated at its end with silver chloride 26; however, other internal half cells as are well known in the art may be utilized in the electrode of the invention.

The tubular member 12 is substantially filled with a liquid electrolyte 28 leaving only a small airspace 30 above the electrolyte. As explained previously, generally the airspace 30 is purposely provided to permit the expansion of the electrolyte when the electrode is utilized in elevated temperature environments. However, even when the electrode is assembled in an effort to prevent any gas space from being formed above the electrolyte, this is difficult to attain due to the failure of the material sealing the end of the electrode to prevent the leak of gas into the electorde. With the electrode disposed in the position illustrated in the drawing, that is, with the ion sensitive barrier 14 at the bottom of the electrode so that the electrolyte is in contact with the barrier by gravitational force, there is no problem of the air bubble 30 migrating to the barrier 14. However, if the electrode is positioned on its' side or in an inverted position, such as may be the case if the electrode were utilized for in vivo ion concentration measurements in a living body, or if the electrode is used in a zero gravity environment, air bubbles may migrate to the ion sensitive barrier producing erroneous ion concentration measurements. According to the improvement which comprises the present invention, an inert porous body 32 is positioned in the electrode for preventing the migration of the gas bubble to the ion sensitive barrier. It is preferable that the porous body 32 have a large surface area, which may be provided by a large number of interstitial spaces in the body, in order to maximize the surface tension of the body for liquids. Thus, when the body is completely wetted by the electrolyte 28, the movement of gas bubbles through the body and liquid electrolyte is prevented. Examples of porous bodies having these characteristics are packed bodies of glass wool, quartz wool or abestos fibers, the degree of packing determining the surface area of the bodies and, therefore, their surface tension for liquid.

Although the porous body 32 illustrated in the drawing is shown as almost substantially filling the entire tubular member 12 and bulb 14 of the electrode 10, it is to be understood that migration of gas bubbles to the bulb 14 could be substantially prevented by providing only a relatively short section of the porous body in an intermediate section of the tubular member 12. Also, in the case where the electrode 10 is of a construction in which the internal half cell 22 extends into the bulb 14 and the bulb is sealed from the remainder of the tubular member 12, the porous member 32 obviously need only fill the bulb 14 where the electrolyte is located.

The ability of the porous body 32 to prevent the migration of gas bubbles to the ion sensitive barrier 14 has been clearly verified. In one test, for example, an electrode as illustrated in the drawing filled with an electrolyte except for an air bubble above the electrolyte was positioned in a centrifuge with the air bubble end of the electrode located adjacent the rotor of the centrifuge and the barrier 14 spaced radially outwardly therefrom. This electrode was subjected to a force twenty times that of gravity for five minutes with no visual indication of gas bubbles migrating to the ion sensitive barrier of the electrode. Also, it was found that the electrode performance before and after the centrifuging of the electrode was identical, thus substantiating the conclusion that no bubbles migrated to the ion sensitive bulb.

There are several methods by which the electrode 10 of the invention containing the porous body 32 may be filled with electrolyte. In one method, a hypodermic needle of a syringe may be inserted through the porous body 12 disposed in the electrode until the tip of the needle is adjacent to the ion sensitive barrier 14. By actuating the syringe, the electrode fills with electrolyte from the bottom of the electrode. This method is generally satisfactory but sometimes results in the formation of some gas bubbles in the electrolyte impregnated plug 32. The electrode may also be filled with electrolyte by immersing the electrode containing the porous plug in a body of the electrolyte and covering the same with a vacuum jar. Upon drawing a vacuum, any gas within the interstices of the porous body 32 is removed and, thereafter, when the vacuum is released the electrolyte fills the evacuated space within the electrode 10. This method, however, requires somewhat elaborate equipment and techniques.

According to another feature of the invention, on extremely simplified and successful method has been found for filling the electrode of the invention with electrolyte without the formation of any gas bubbles therein. The container formed by the tubular member 12 and barrier 14, without the porous body 32 therein, is filled with a solvent which has a boiling point below that of the liquid electrolyte with which it is desired to fill the container. An example of such a solvent is alcohol where the electrolyte is an aqueous buffer, such as one Molar HCl. Thereafter, the porous body 32 is positioned in the container and the assembly submerged into a body of the liquid electrolyte. The electrolyte is then heated to the boiling point of the solvent thus causing the solvent to transform into a vapor or gaseous phase which escapes from the container and body of electrolyte in the form of bubbles to the atmosphere. The loss of the solvent produces a vacuum within the container or tubular member 12 which, upon cooling, is filled by the electrolyte in which the container is submerged as the container and electrolyte are cooled. It has been found that by utilizing this method the tubular member 12 and porous body 32 are filled with electrolyte without the formation of any bubbles therein.

Although the above method has been described specifically in connection with the filling of an electrochemical electrode with an electrolyte, it is to be understood that the method is also applicable to any other situation where it is desired to fill a container having a porous body therein with a liquid and to prevent the formation of bubbles in the liquid.

Although several embodiments of the invention have been disclosed herein for purposes of illustration, it will be understood that various changes can be made in the form, details, arrangement and proportions of the various parts of such embodiment and in the application of the embodiment without departing from the spirit and scope of the invention as defined by the appended claims.

What is claimed is:
1. A method of filling with a liquid a container having a porous body therein comprising the steps of:
 filling said container with a solvent having a boiling point below that of said liquid;
 positioning said porous body in said container;
 submerging said container into a body of said liquid; and
 heating said liquid to the boiling point of said solvent whereby said liquid displaces said solvent which escapes to the atmosphere as a vapor.

2. The method as set forth in claim 1 wherein said solvent is alcohol.

References Cited

UNITED STATES PATENTS

| 3,103,480 | 9/1963 | Watanabe et al. | 204—195.1 |
| 1,345,347 | 7/1920 | Chaney | 141—7 |
| 2,117,596 | 5/1938 | Bender et al. | 204—195.1 |
| 2,387,727 | 10/1945 | Godshalk | 204—195.1 |
| 2,696,937 | 12/1954 | Johnson et al. | 141—7 |

FOREIGN PATENTS

| 492,936 | 9/1938 | Great Britain. |
| 713,093 | 10/1941 | Germany. |
| 1,013,055 | 4/1952 | France. |

JOHN H. MACK, *Primary Examiner.*

T. TUNG, *Assistant Examiner.*

U.S. Cl. X.R.

117—54; 141—7, 8, 82; 204—279